US012629846B2

(12) United States Patent
Lei et al.

(10) Patent No.: US 12,629,846 B2
(45) Date of Patent: May 19, 2026

(54) FIXTURE AND METHOD FOR HANDLING STACKING OBJECTS

(71) Applicant: ABB SCHWEIZ AG, Baden (CH)

(72) Inventors: Haoteng Lei, Shanghai (CN); Jianqiang Jia, Shanghai (CN); Dongjie Guo, Shanghai (CN); Bojun Ma, Shanghai (CN); Yin Tian, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/059,034

(22) Filed: Feb. 20, 2025

(65) Prior Publication Data

US 2025/0187205 A1      Jun. 12, 2025

Related U.S. Application Data

(63) Continuation of application No. PCT/CN2022/119698, filed on Sep. 19, 2022.

(51) Int. Cl.
B25J 15/00       (2006.01)
B65G 59/06       (2006.01)

(52) U.S. Cl.
CPC ........ B25J 15/0052 (2013.01); B65G 59/067 (2013.01)

(58) Field of Classification Search
CPC ...... B65G 57/00; B65G 59/06; B65G 59/063; B65G 59/062; B65G 59/102; B65G 59/103; B65G 59/00; B65G 59/061; B65G 57/303; B65G 57/165; B65G 59/067; B65G 1/14; B65G 47/907; B65G 61/00; B65G 57/02; B65G 59/02; B65H 2301/42122; B65H 2301/42322; B65H 67/065; B65H 2301/422; B25J 15/00; B25J 15/0052; B25J 15/0293
USPC ... 414/736, 749.5, 789.9, 796, 796.9, 790.2; 294/87.26, 87.1, 87.2
See application file for complete search history.

(56) References Cited

U.S. PATENT DOCUMENTS

| | | | |
|---|---|---|---|
| 4,904,142 A | | 2/1990 | Sato |
| 5,425,565 A | * | 6/1995 | Rogovein .......... B65H 31/3072 414/790.2 |
| 7,260,448 B2 | * | 8/2007 | Goto ................. H01L 21/68707 700/218 |
| 9,387,992 B2 | * | 7/2016 | Boschi ................. B65G 47/904 |
| 9,919,431 B2 | * | 3/2018 | Oh ............................ B25J 5/04 |
| 10,300,610 B1 | * | 5/2019 | La Rovere ............... B65G 1/14 |

(Continued)

FOREIGN PATENT DOCUMENTS

| | | | | |
|---|---|---|---|---|
| CN | 112110188 A | * | 12/2020 | ........... B65G 47/248 |
| CN | 112357569 A | * | 2/2021 | ............. B62D 63/02 |

(Continued)

*Primary Examiner* — Gregory W Adams
(74) *Attorney, Agent, or Firm* — Greenberg Traurig, LLP

(57) ABSTRACT

A fixture and a method for handling stacking objects which can improve automation degree of handling stacking objects. The fixture for handling stacking objects includes a frame; a first carriage which has a first upper arm; a second carriage which has a second upper arm; and a first actuator configured to synchronously move the first carriage and the second carriage in the first direction between a first position at which the first upper arm and the second upper arm to clamp a first object from two opposite sides of the first object.

19 Claims, 8 Drawing Sheets

(56) References Cited

U.S. PATENT DOCUMENTS

| | | | | |
|---|---|---|---|---|
| 10,668,628 B2 * | 6/2020 | Guo | .................... | B25J 15/0293 |
| 10,953,552 B1 * | 3/2021 | Dulla | .................. | B65H 67/065 |
| 2012/0039699 A1 * | 2/2012 | Ward | .................... | B65G 57/26 |
| | | | | 414/590 |
| 2021/0221457 A1 * | 7/2021 | Wen | ...................... | B62D 65/12 |
| 2021/0331327 A1 * | 10/2021 | Lee | .................... | B25J 15/0253 |

FOREIGN PATENT DOCUMENTS

| | | | | | |
|---|---|---|---|---|---|
| CN | 212502254 U | | 2/2021 | | |
| CN | 213212139 U | | 5/2021 | | |
| EP | 1216950 A1 | | 6/2002 | | |
| EP | 2289826 A1 | | 3/2011 | | |
| GB | 925041 A | | 5/1963 | | |
| GB | 1554183 A | | 10/1979 | | |
| IT | 201900007749 A1 | * | 12/2020 | .......... | B65G 59/063 |
| WO | 2014090275 A1 | | 6/2014 | | |
| WO | 2022193347 A1 | | 9/2022 | | |

* cited by examiner

400

402
GRIPPING A FIRST OBJECT FROM TWO OPPOSITE SIDES OF THE FIRST OBJECT

404
GRIPPING A SECOND OBJECT FROM TWO OPPOSITE SIDES OF THE SECOND OBJECT

406
SEPARATING THE FIRST OBJECT FROM THE SECOND OBJECT

FIXTURE AND METHOD FOR HANDLING STACKING OBJECTS

CROSS-REFERENCE TO RELATED APPLICATIONS

This application claims priority to and is a continuation application of international patent application number PCT/CN2022/119698, filed on Sep. 19, 2022, which is herein incorporated by reference in its entirety.

FIELD

Embodiments of the present disclosure generally relate to a field of industrial robots, and more particularly to a fixture and a method for handling stacking objects.

BACKGROUND

In retail industries, such as chain supermarkets, convenience stores and other shopping and producing places, commodities for different orders are generally sorted, packed, and distributed in a warehouse. These commodities are firstly placed in different containers, such as totes and the like, and then are to be sorted and delivered. Typically, since there are a large number of orders, the number of containers is generally very large. The totes need to be sorted and put in and out of the warehouse frequently according to orders.

These handling processes for a large number of containers are generally time consuming and labor intensive. In order to save space and standardize management, the containers in the warehouses will be stacked, which increases difficulties of sorting and transferring these containers. In some cases, the warehouse is in a lower temperature environment, for example, at 0~4 degree centigrade, which may cause health issues to workers. Conventionally, handling a large number of containers is manually performed, which is not only time-consuming but labor-consuming. These processes are of lower efficiency and high costs and also are subject to safety risks. There is an increasing need to automate handling of the stacking objects.

SUMMARY

Example embodiments of the present disclosure provide a fixture and a method for handling stacking objects which can improve automation degree of handling stacking objects.

In a first aspect of the present disclosure, it is provided a fixture for handling stacking objects. The fixture comprises a frame; a first carriage arranged on the frame and comprising a first upper arm; a second carriage arranged on the frame in parallel with the first carriage at a position different from the first carriage in a first direction and comprising a second upper arm, and a first actuator attached to the frame and configured to synchronously move the first carriage and the second carriage in the first direction between a first position at which the first upper arm and the second upper arm are close to each other to clamp a first object from two opposite sides of the first object and a second position at which the first upper arm and the second upper arm are far away from each other to release the first object. With this arrangement, the object in the stack can be flexibly picked up and released by moving the first upper arm and the second upper arm.

In some embodiments, the first and second carriages each may comprise a lifting mechanism configured to lift the respective upper arm in a second direction perpendicular to the first direction. With this arrangement, any object in the stack can be flexibly selected and further handled by the lifting mechanism.

In some embodiments, the lifting mechanism may comprise: a first linear guide rail extending in the second direction; a driving means comprising a motor and a screw rod coupled to the motor; and a driven block configured to be linearly driven by the screw rod along the first linear guide rail, the upper arm being carried by the driven block. With this arrangement, the lifting mechanism can be easily implemented.

In some embodiments, the first and second carriages each may comprise a first guide arm and a first pneumatic actuator arranged on the first guide arm, the first pneumatic actuator being configured to move the respective upper arm in a third direction perpendicular to the first and second directions between a retracted position and an extended position. With this arrangement, the object in the stack can be flexibly handled by retracting and/or extending the pair of upper arms.

In some embodiments, the first guide arm may comprise a second linear guide rail extending in the third direction, the respective upper arm comprising a rod extending in the third direction and being configured to move along the second linear guide rail. With this arrangement, the movement of the pair of upper arms can be reliably guided.

In some embodiments, the first and second carriages each may comprise a first support plate extending in the second direction and configured to support the lifting mechanism; and the frame comprises a pair of third linear guide rails extending in the first direction and spaced from each other in the second direction, the first support plate being configured to move along the pair of the third linear guide rails. With this arrangement, the fixture can be made compact with reduced weight and space occupation.

In some embodiments, the first actuator may comprise a second pneumatic actuator comprising two output members, the two output members being coupled with the first and second carriages, respectively, by universal joints to synchronously drive the first and second carriages by the second pneumatic actuator. With this arrangement, the compactness of the fixture can be further improved.

In some embodiments, the fixture further may comprise a third carriage arranged on the frame in parallel with the first carriage at a position different from the first carriage in the second direction and comprising a first lower arm; a fourth carriage arranged on the frame in parallel with the third carriage at a position different from the third carriage in the first direction and comprising a second lower arm; and a second actuator attached to the frame and configured to synchronously move the third carriage and the fourth carriage in the second direction between a third position at which the first lower arm and the second lower arm are close to each other to clamp a second object from two opposite sides of the second object and a fourth position at which the first lower arm and the second lower arm are far away from each other to release the second object. With this arrangement, any object in the stack can be flexibly handled by cooperation of the pair of upper arms and the pair of lower arms.

In some embodiments, the third and fourth carriages each may comprise a second guide arm and a third pneumatic actuator arranged on the second guide arm, the third pneumatic actuator being configured to drive the respective lower arm in the third direction between a retracted position and an extended position; and the second guide arm comprises a fourth linear guide rail extending in the third direction, the respective lower arm comprising a rod extending in the third direction and being configured to move along the fourth linear guide rail. With this arrangement, the object in the stack can be flexibly handled by retracting and/or extending the pair of upper arms.

In some embodiments, the third and fourth carriages each may comprise a second support plate extending in the second direction, the third and fourth carriages being configured to move in the first direction by a sliding engagement between the second support plate and the frame. With this arrangement, the fixture can be made compact with reduced weight and space occupation.

In some embodiments, the second actuator may comprise a fourth pneumatic actuator comprising two output members, the two output members being coupled with the third and fourth carriages, respectively, by universal joints to synchronously move the third and fourth carriages by the fourth pneumatic actuator. With this arrangement, the compactness of the fixture can be further improved.

In some embodiments, the frame may comprise a pair of third linear guide rails extending in the first direction and spaced from each other in the second direction, the first, second, third, and fourth carriages being configured move along the pair of the third linear guide rails. With this arrangement, the compactness of the fixture can be further improved with sufficient structural strength.

In a second aspect of the present disclosure, it is provided a robot. The robot comprises a robotic arm; and a fixture for handling stacking objects according to any of the first aspect, the fixture being attached to the robotic arm.

In a third aspect of the present disclosure, it is provided a method for handling stacking objects. The method comprises gripping a first object in the stacking objects from two opposite sides of the first object by moving a first upper arm of a first carriage and a second upper arm of a second carriage close to each other in a first direction; gripping a second object located below the first object from two opposite sides of the second object by moving a first lower arm of a third carriage and a second lower arm of a fourth carriage close to each other in the first direction; and separating the first object from the second object.

In some embodiments, separating the first object from the second object may comprise: lifting the first object in a second direction perpendicular to the first direction by a lifting mechanism to form a gap between the first object and the second object in the second direction; and moving one of the first object and the second object by extending or retracting the first and second upper arms or the first and second lower arms in a third direction perpendicular to the first and second directions.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
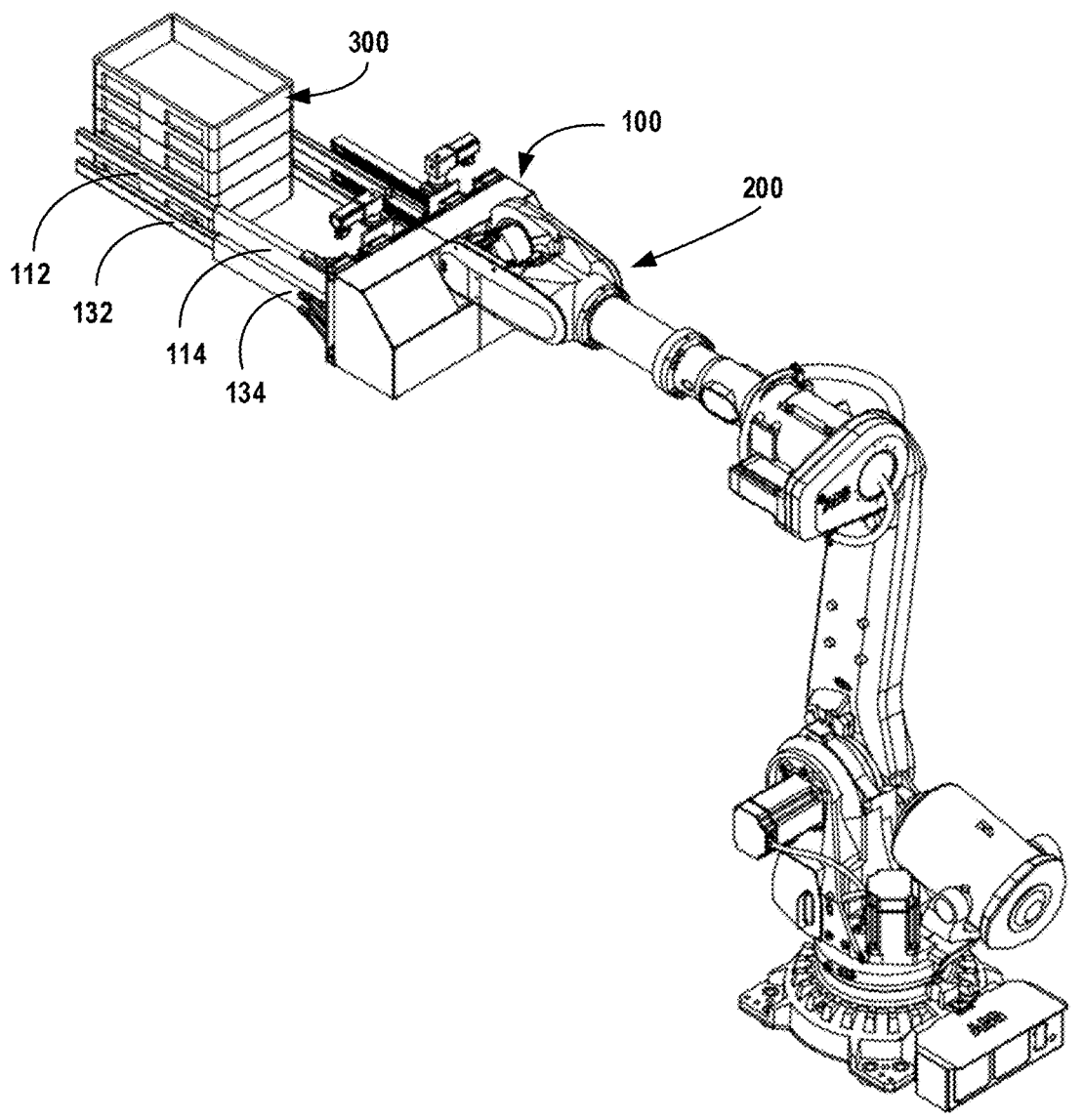
FIG. 1 is a schematic view of a robot for handling stacking objects according to one example embodiment of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state that can be achieved by an operation induced by a user or an external mechanism. The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below. A definition of a term is consistent throughout the description unless the context clearly indicates otherwise.

In retail industries, containers such as totes are widely used for housing commodities. The containers are of various forms and are generally standardized and/or customized for shipping. The container is generally of a specific shape (for example, a rectangular shape) adapted to be delivered and shipped and has a top opening through which articles can be placed into the containers. The container can be placed one on another so that a plurality of containers can be stacked to save space. The container may also be provided with side ribs so that the container can be gripped, picked up, or transferred easily by gripping the side ribs.

Commodities for different orders are generally placed in different containers in a warehouse. The containers are stacked in the warehouse and should be handled properly, for example, being sorted and transferred and the like, before they are shipped. In some application scenarios, the stacked containers are, for example, placed on an arc shaped or elongate shelf. However, when objects (for example, the containers) are stacked, it is not easy for a robotic arm of a robot to select one object in the stack and move the selected object out of the stack. Also, there are a large number of containers in the warehouse. The containers need to be sorted and put in and out of the warehouse with higher efficiency to meet industrial requirements. According to the present disclosure, a fixture for handling stacking objects is proposed, which is adapted to handling objects in a flexible and efficient way.

Through the following detailed descriptions with reference to the accompanying drawings, the above features and advantages of the example embodiments disclosed herein will become more comprehensible.

FIG. 1 is a schematic view of a robot for handling stacking objects 300 according to one example embodiment of the present disclosure. As shown in FIG. 1, the robot comprises a robotic arm 200 and a fixture 100 for handling stacking objects 300 fixed to the robotic arm 200.

The fixture 100 is attached to the robotic arm 200 and can be moved by the robotic arm 200 within a working area of the robot. In some application scenarios, the objects 300, e.g., the container, are placed on an arc-shaped shelf or an elongate shelf (not shown). The containers may be filled with articles (e.g. commodities) according to orders. The robotic arm 200 may move around in the working area of the robot so as to handle the objects 300 properly. The fixture 100 for handling stacking objects 300 is configured to pick up one or more objects 300 in the stack, and move the selected objects 300 from one place to another. The fixture 100 may comprise one or more pair of arms 112, 122, 132, 142 which are configured to grip and release the object 300 from two opposite sides of the object 300. It is to be understood that the object 300 may be a container or any other object.

FIGS. 2-6 show detailed configurations of the fixture 100 for handling stacking objects according to one example embodiment of the present disclosure. The detailed structures and its variants of the fixture would be illustrated with reference to FIGS. 2-6.

Figure 2:
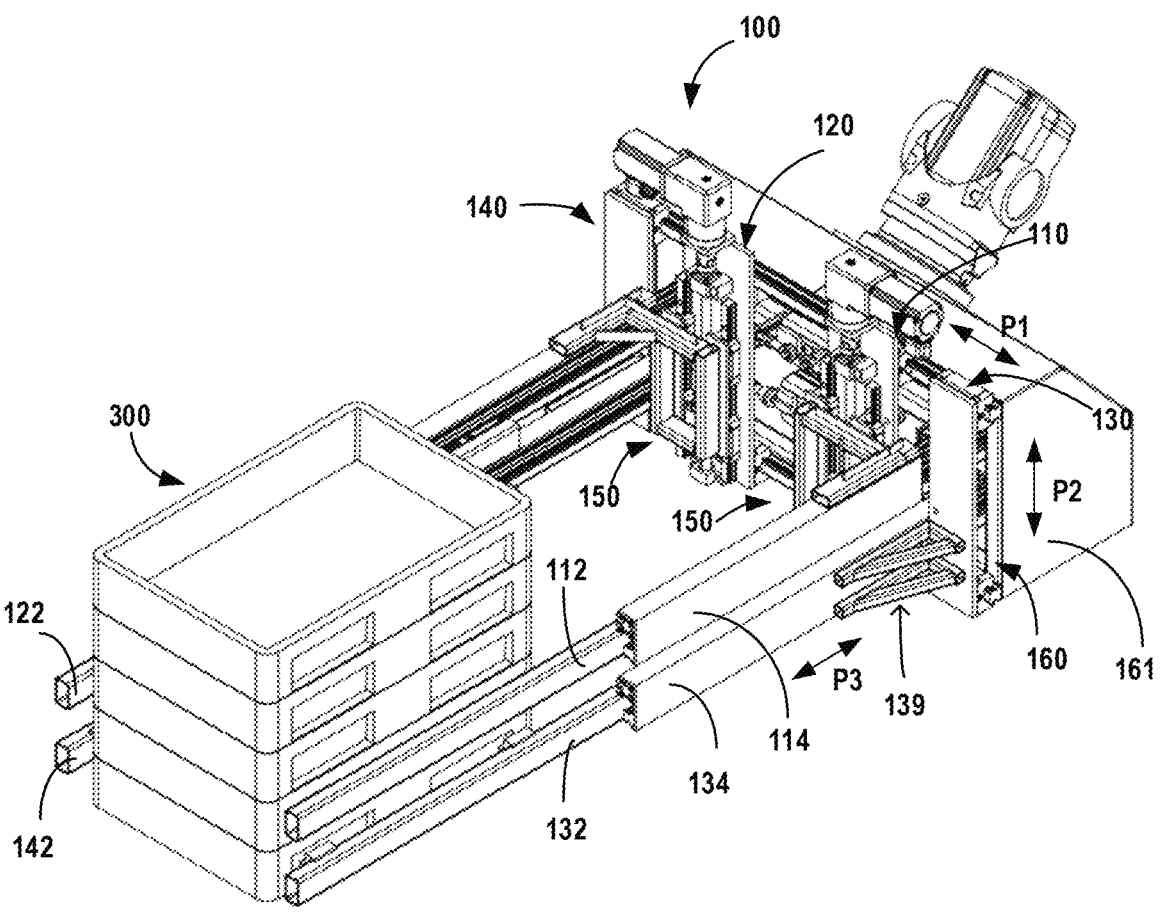
FIG. 2 is a schematic perspective view of a fixture for handling stacking objects according to one example embodiment of the present disclosure.
Figure 3:
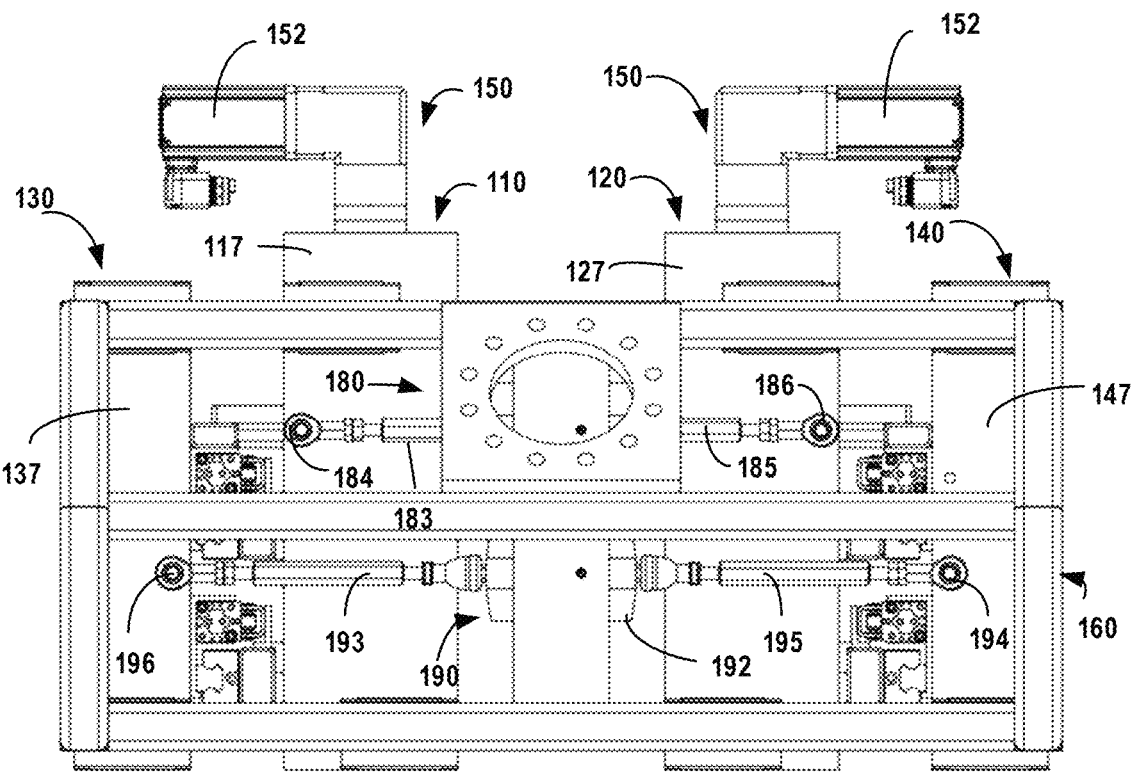
FIG. 3 is a schematic plane view of a fixture for handling stacking objects as viewed from a back of the fixture according to one example embodiment of the present disclosure.

As shown in FIGS. 2-6, the fixture 100 for handling stacking objects comprises a frame 160, a first carriage 110, and a second carriage 120. The frame 160 is configured to support the associated functional components of the fixture. The fixture 100 may be fixed to the robotic arm 200 by the frame. In some embodiments, as shown in FIG. 3, the frame 160 may comprise a flange and a mounting hole for receiving the robotic arm is provided on the flange. The robotic arm can be fixed to the flange by fixing means, such as bolt and nut, screws and the like. The frame 160 may take various forms. In the shown example, the frame is configured as a rigid support body. In some embodiments, a cover 161 may also be provided on the frame 160 so as to protect components, e.g., driving means for moving the first carriage 110 and the second carriage 120.

The first carriage 110 is movably arranged on the frame 160 and may comprise a first upper arm 112 arranged on the first carriage 110. The first upper arm 112 is configured to move in a first direction P1. Likewise, the second carriage 120 is movably arranged on the frame 160 and comprises a second upper arm 122 arranged on the second carriage 120. The second upper arm 122 is configured to move in the first direction P1. By moving the first and second upper arms 112, 122 to a gripping position, the pair of the upper arms 112, 122 can grip the object from a lateral opposite side of the object 300. By moving the first and second upper arms 112, 122 away from each other from the gripping position, the pair of the upper arms 112, 122 can release the object 300.

The first carriage 110 and the second carriage 120 may be driven by various means. In some embodiments, the first carriage 110 and the second carriage 120 are driven independently by different actuators. For example, for each carriage, an actuator is provided for driving the carriage. In some embodiments, the first carriage 110 and the second carriage 120 are driven by a single one actuator. The actuator may be pneumatic actuator, or any other proper forms, for example, electric servo actuator.

In some embodiments, as shown in FIG. 3, a pneumatic actuator 180 is provided and is attached to the frame 160. The pneumatic actuator 180 may comprise two output members 183, 185 which are coupled to the first carriage 110 and the second carriage 120 respectively. The actuator 180 is configured to synchronously move the first carriage 110 and the second carriage 120 in the first direction between a first position and a second position. At the first position, the first upper arm 112 and the second upper arm 122 are close to each other to clamp an object 300 from two opposite sides of the object 300. At the second position, the first upper arm 112 and the second upper arm 122 are far away from each other to release the object 300. With this arrangement, the object 300 can be easily gripped or released by the first upper arm 112 and the second upper arm 122 when the first carriage 110 and the second carriage 120 are synchronously moved.

In some embodiments, as shown in FIG. 3, the two output members 183, 185 are coupled with the first and second carriages 110, 120, respectively, by universal joints 184, 186. With the universal joints, manufacturing and assembly tolerance can be tolerated to ensure that the first and second carriages 110, 120 are synchronized moved.

In some embodiments, the upper arms 112, 122 may be further designed to be movable in a second direction P2 perpendicular to the first direction P1. This may increase flexibility of the fixture for handling the stacking objects. As shown in FIGS. 2, 4, 5, and 6, the first and second carriages 110, 120 each may comprise a lifting mechanism 150. The lifting mechanism 150 is configured to lift the respective upper arm 112, 122 in a second direction P2 perpendicular to the first direction P1. With the lifting mechanism 150, in addition to the movements along the first direction P1, the upper arms 112, 122 can also be moved in the second direction P2. Since the upper arms 112, 122 are movable in the second direction P2, the fixture 100 can handle any object 300, for example, gripping the object in the stack and selectively move the selected object in the second direction P2.

Figure 4:
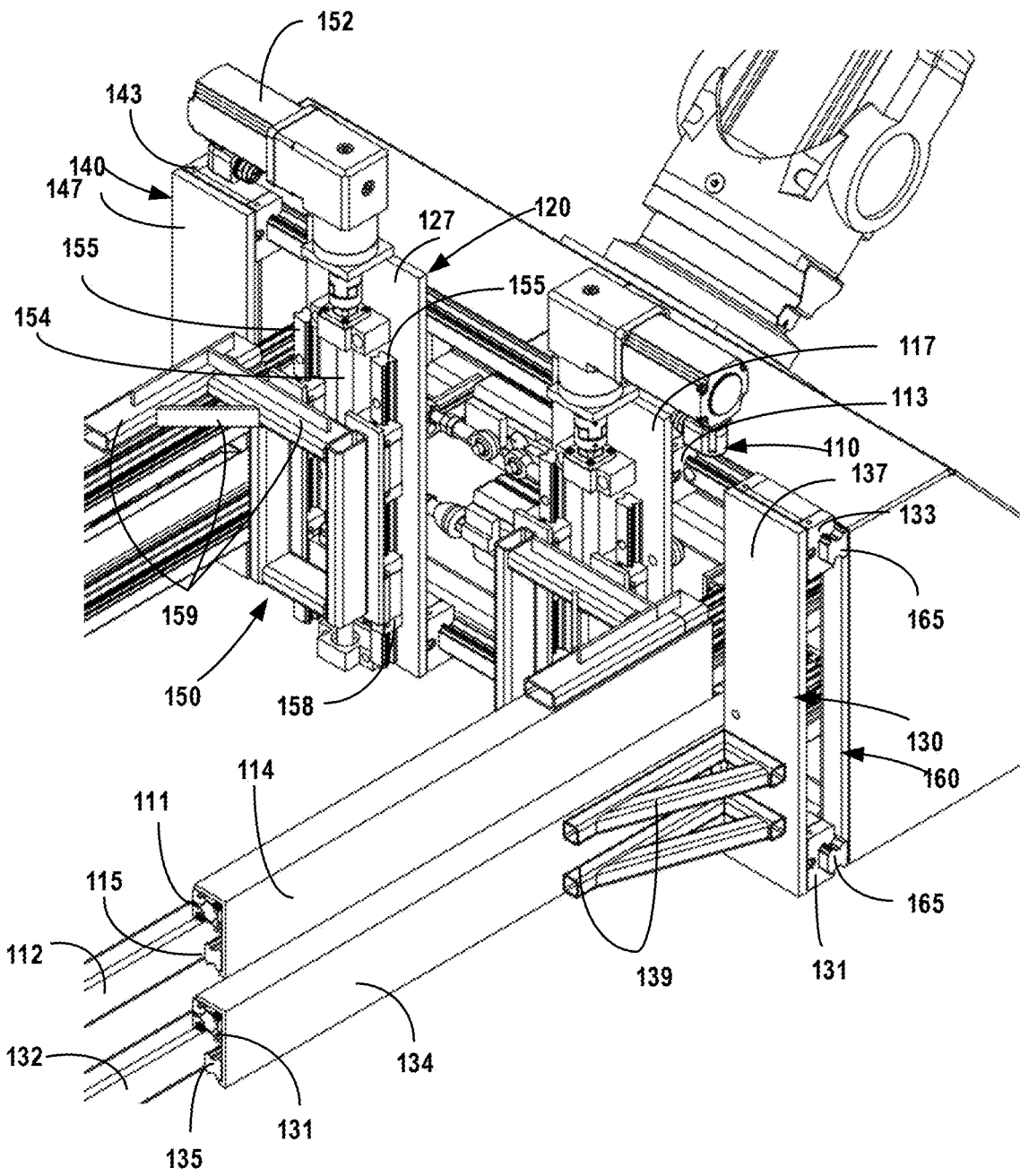
FIG. 4 is a closed up view of the fixture for handling stacking objects in FIG. 2.

The lifting mechanism 150 may take various forms, such as pulley arrangements, screw rod arrangements and the like. In some embodiments, as shown in FIG. 4, the lifting mechanism 150 may comprise a first linear guide rail 155, a driving means, and a driven block 158. The linear guide rail 155 may extend in the second direction P2 (i.e., a vertical direction in the shown example). In the shown example, a pair of the guide rails 155 is provided. The driving means may comprise a motor 152 and a screw rod 154 coupled to the motor 152. The driven block 158 is linearly driven by the screw rod 154 along the linear guide rail 155. The upper arms 112, 122 are further carried by the driven block 158. With this arrangement, movements of the upper arms 112, 122 in the first direction do not interfere with movements of the upper arms 112, 122 in the second direction. It is to be understood that the screw rod arrangement is merely illustrative and the lifting mechanism 150 may take any other proper forms as long as the upper arms 112, 122 can be moved along the second direction.

In some embodiments, as shown in FIGS. 2-5, the first carriage 110 and the second carriage 120 each may comprise a support plate 117, 127 extending in the second direction P2. With the plate structure, technical advantages can be achieved. The functional components, such as the lifting mechanism 150 and the upper arms 112, 122 of the first carriage 110 and the second carriage 120 can be supported on the support plate 117, 127. Also, with the plate structure, the first carriage 110 and the second carriage 120 can be reliably and robustly supported on the frame 160 since this plate configuration makes it possible to arrange two or more guide rails to guide the movement of the first carriage 110 and the second carriage 120. Also, the plate structure may contribute to weight balance and space efficiency considering the fact that the fixture is moving around by the robotic arm.

Figure 5:
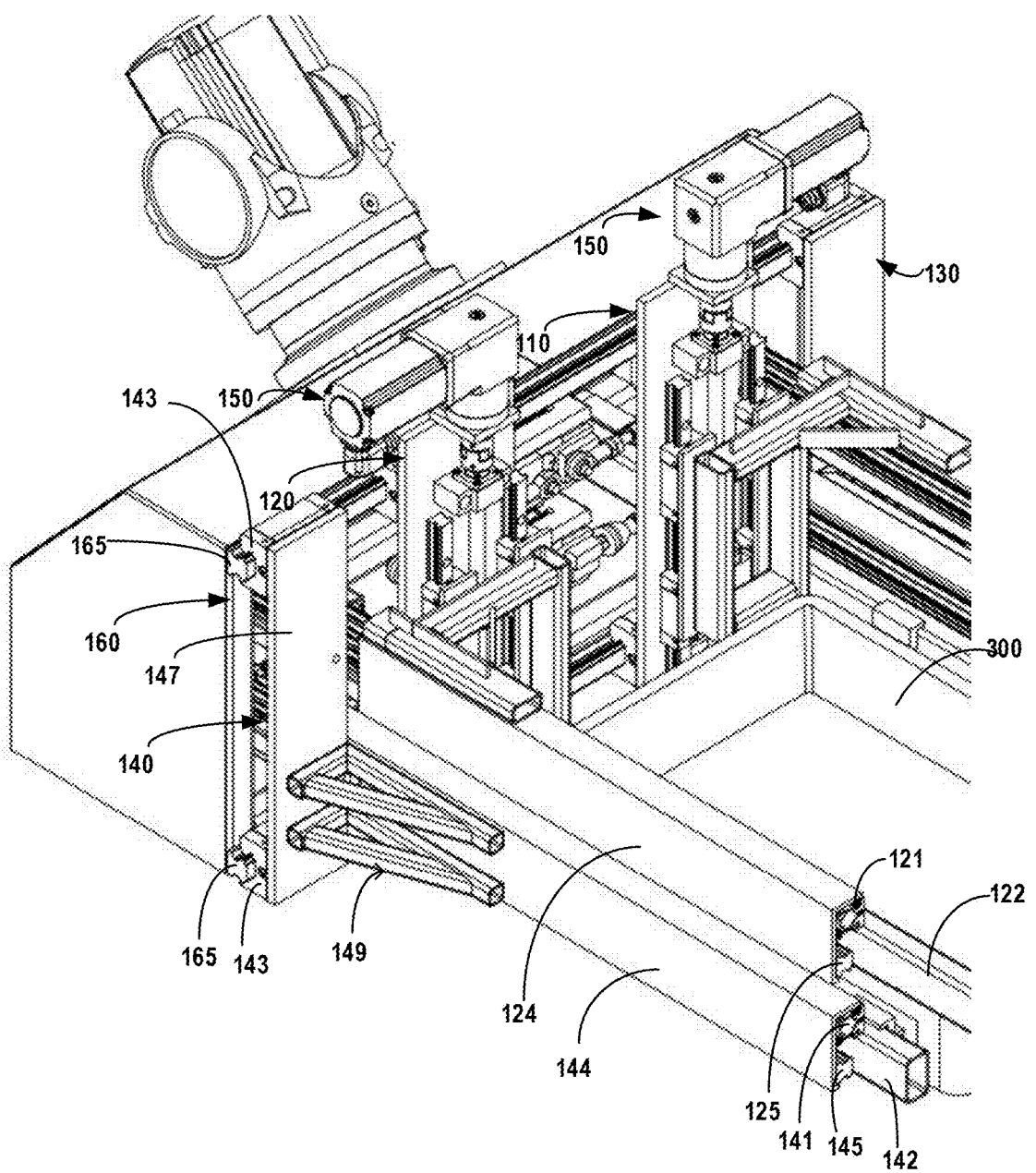
FIG. 5 is a closed up view of the fixture for handling stacking objects in FIG. 2 as viewed from a different perspective.

In some embodiments, as shown in FIGS. 2, 4, and 5, the frame 160 may comprise a linear guide rail 165 extending in the first direction P1. The first carriage 110 and the second carriage 120 may comprise a sliding shoe 113, 123 for mating the linear guide rail 165. In the shown example, the first carriage 110 and the second carriage 120 share the linear guide rail 165. This is advantageous since sharing the linear guide rail can reduce the weight of the fixture and increase the compactness of the fixtures. In some embodiments, as shown in FIGS. 4 and 5, a pair of linear guide rails 165 is provided. In this way, the carriage 110 and 120 can be reliably moved on the frame.

Figure 6:
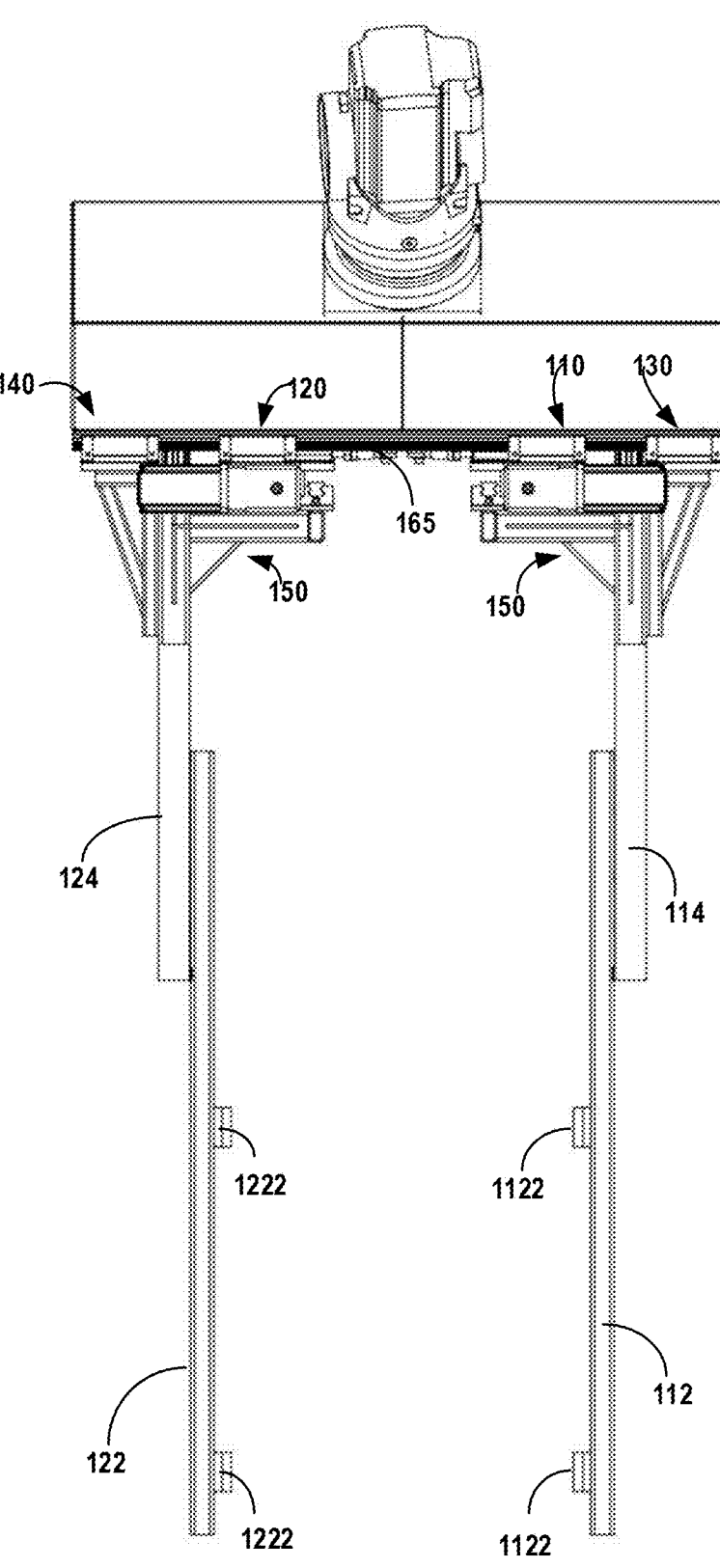
FIG. 6 is a top view of a fixture for handling stacking objects according to one example embodiment of the present disclosure.

In some embodiments, the pair of the upper arms 112, 122 is designed to be movable in a third direction P3 perpendicular to the first direction P1 and the second direction P2. This may further increase flexibility of the fixture for handling the objects which will be illustrated later by referring to FIGS. 8-10. In some embodiments, as shown in FIGS. 2, 4, and 6, the first and second carriages 110, 120 each may comprise a first guide arm 114, 124. An actuator 111, 121 may be arranged on the first guide arm 114, 124 for moving the upper arms 112, 122 in the third direction P3.

As shown in FIG. 6, the upper arms 112, 122 thus can be configured to move between a retracted position at which the upper arms 112, 122 are close to the frame 160 and an extended position at which the upper arms 112, 122 are far away from the frame 160. With this arrangement, it makes it possible to selectively move the object in the third direction P3.

In some embodiments, as shown in FIGS. 4-6, the actuator 111, 121 may be a pneumatic actuator. It is advantageous due to its light weight and clean properties. In some embodiments, the pneumatic actuator may include a rodless cylinder. It is to be understood that the actuator may be any other proper forms, for example, electric servo actuator.

In some embodiments, as shown in FIGS. 4 and 5, the first guide arms 114, 124 each may comprise a second linear guide rail 115, 125 extending in the third direction P. With the linear guide rails 115, 125, the movement of the upper arms 112, 122 can be well guided. In the shown example, as shown in FIG. 6, the upper arms 112, 122 may be in form of a rod extending in the third direction and are configured to move along the second linear guide rails 115, 125. It is to be understood that this is merely illustrative and the upper arms 112, 122 may be any other proper forms. The upper arms 112, 122 each may further comprise a protrusion 1122, 1222 for engaging with the object. When the upper arms 112, 122 contact the object 300, the protrusions 1122, 1222 may engage with the corresponding portions (for example, recess, slots, grooves, or the like) of the object 300 so that the object 300 can be firmly held by the upper arms 112, 122. It is to be understood that this is merely illustrative and the upper arms 112, 122 may be any other proper forms as long as the upper arms can engage with the object reliably and firmly.

In some embodiments, as shown in FIGS. 4 and 6, in order to increase structural strength, one or more support beams or strengthen ribs 159 may be provided. As shown in FIG. 4, one or more support beams 159 are provided to connect the driven block 158 and the guide arms 114, 124. In this way, the strength of the upper arms can be improved meanwhile the compactness of the fixture can be maintained.

In some embodiments, as shown in FIGS. 1-6, the fixture 100 may further comprise a third carriage 130 comprising a first lower arm 132 and a fourth carriage 140 comprising a second lower arm 142. The third carriage 130 is arranged on the frame 160 in parallel with the first carriage 110 at a position different from the first carriage 110 in the second direction P2. The fourth carriage 140 is arranged on the frame 160 in parallel with the third carriage 130 at a position different from the third carriage 130 in the first direction P1. The third carriage 130 and the fourth carriage 140 are configured to move in the second direction P2. By the third carriage 130 and the fourth carriage 140, the lower arms 132, 142 can be movable at a third position at which the first lower arm 132 and the second lower arm 142 are close to each other to clamp a second object 300 from two opposite sides of the second object 300 and a fourth position at which the first lower arm 132 and the second lower arm 142 are far away from each other to release the second object 300. With this arrangement, it makes it possible to operate at least two different objects with the fixture 100.

The third carriage 130 and the fourth carriage 140 may be driven by various means. In some embodiments, the third carriage 130 and the fourth carriage 140 are driven independently by different actuators. For example, for each carriage, an actuator is provided for driving the carriage. In some embodiments, the third carriage 130 and the fourth carriage 140 are driven by a single one actuator. The actuator may be pneumatic actuator, or any other proper forms, for example, electric servo actuator. In some embodiments, as shown in FIG. 3, a pneumatic actuator 190 is provided and attached to the frame 160. The pneumatic actuator 190 may comprise two output members 193, 195 which are coupled to the third carriage 130 and the fourth carriage 140 respectively. The actuator 190 is configured to synchronously move the third carriage 130 and the fourth carriage 140 in the first direction.

In some embodiments, as shown in FIG. 3, the two output members 193, 195 are coupled with the third carriage 130 and the fourth carriage 140, respectively, by universal joints 194, 196. With the universal joints, manufacturing and assembly tolerance can be tolerated to ensure that the third carriage 130 and the fourth carriage 140 are synchronized moved.

In some embodiments, as shown in FIGS. 2-5, the third carriage 130 and the fourth carriage 140 each may comprise a support plate 137, 147 extending in a second direction P2. The third and fourth carriages 130, 140 are configured to move in the first direction by a sliding engagement between the support plates 137, 147 and the frame 160.

In some embodiments, as shown in FIGS. 2, 4, and 5, the third carriage 130 and the fourth carriage 140 may comprise a sliding shoe 133, 143. In the shown example, the third carriage 130 and the fourth carriage 140 use the same guide rails 165 as the first carriage 110 and the second carriage 120. This is advantageous since sharing the linear guide rail can reduce the weight of the fixture and increase the compactness of the fixtures.

In some embodiments, the lower arms 122, 132 are designed to be movable in the third direction P3. This may further increase flexibility of the fixture for handling the objects. In some embodiments, as shown in FIGS. 2, 4, and 6, the third carriage 130 and the fourth carriage 140 may comprise guide arms 134, 144. An actuator 131, 141 may be arranged on the guide arm 134, 144 for moving the lower arms 132, 142 in the third direction P3. The lower arms 132, 142 thus can be configured to move between a retracted position at which the lower arms 132, 142 are close to the frame 160 and an extended position at which the lower arms 132, 142 are far away from the frame 160. With this arrangement, it makes it possible to selectively move the object 300 in the third direction P3.

In some embodiments, as shown in FIGS. 4-6, the actuators 131, 141 may be pneumatic actuators which are arranged on the first guide arms 114, 124. The pneumatic actuators 131, 141 are configured to move the respective lower arms in the third direction P3. In some embodiments, the pneumatic actuator may include a rodless cylinder.

In some embodiments, as shown in FIGS. 4 and 5, the guide arms 134, 144 each may comprise linear guide rails 135, 145 extending in the third direction P. With the linear guide rails 135, 145, the movement of the lower arms 132, 142 can be well guided. In some examples, the lower arms 132, 142 may further comprise protrusions for engaging with the object. When the lower arms 132, 142 contact the object 300, the protrusions may engage with the corresponding portion (for example, recess, slots, grooves, or the like) of the object 300 so that the object 300 can be firmly held by the lower arms 132, 142. It is to be understood that this is merely illustrative and the lower arms may be any other proper forms as long as the upper arms can engage with the object reliably and firmly.

In some embodiments, as shown in FIGS. 4-6, in order to increase structural strength, one or more support beams or strengthen ribs 139, 149 may be provided. The support beams 139, 149 are provided to strengthen the connection between the plates 137, 147 and the guide arms 134, 144. In this way, strength of the upper arms can be improved meanwhile the compactness of the fixture can be maintained.

Figure 7:
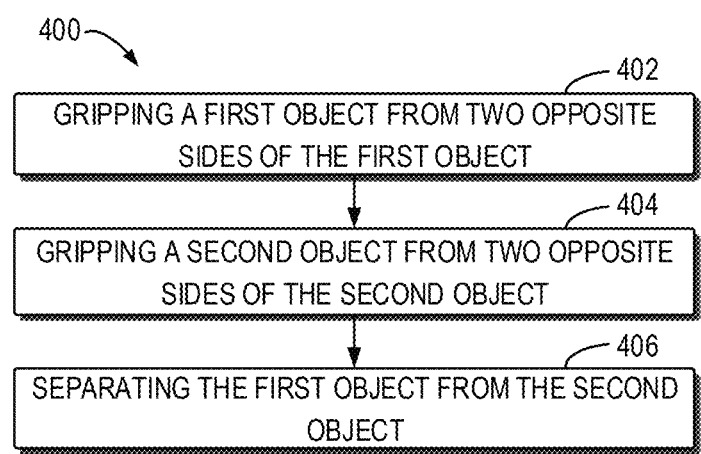
FIG. 7 is a flow chart of the method for handling stacking objects according to one example embodiment of the present disclosure.

FIG. 7 is a flow chart of the method 400 for handling stacking objects 300 according to one example embodiment of the present disclosure. As shown in FIG. 7, also with reference to FIGS. 1-6, at a block 402, a first object in the stacking objects 300 is gripped from two opposite sides of the first object by moving a first upper arm 112 of a first carriage 110 and a second upper arm 122 of a second carriage 120 close to each other in a first direction. For example, the first upper arm 112 of the first carriage 110 and the second upper arm 122 of the second carriage 120 are synchronously moved to get close to each other so as to grip the object from two opposite sides of the first object 300 by one or more actuators.

At a block 404, a second object located below the first object is gripped from two opposite sides of the second object by moving a first lower arm 132 of a third carriage 130 and a second lower arm 142 of a fourth carriage 140 close to each other in the first direction. For example, the first lower arm 132 of the third carriage 130 and the second lower arm 142 of the fourth carriage 140 are synchronously moved to get close to each other so as to grip the object from two opposite sides of the first object by one or more actuators.

At block 406, the first object is separated from the second object. In some embodiments, the first object may be lifted in a second direction perpendicular to the first direction, for example, by a lifting mechanism 150. In this way, the upper object can thus be movable with respect to the lower object. The first object may be further separated from the second object by extending or retracting the first and second upper arms 112, 122 or the first and second lower arms 132, 142 in a third direction perpendicular to the first and second directions. In this way, the upper object can thus be separate from the lower object by a distance along the third direction easily. In this case, the object in the stack can be selectively moved or being sorted.

Figure 8:
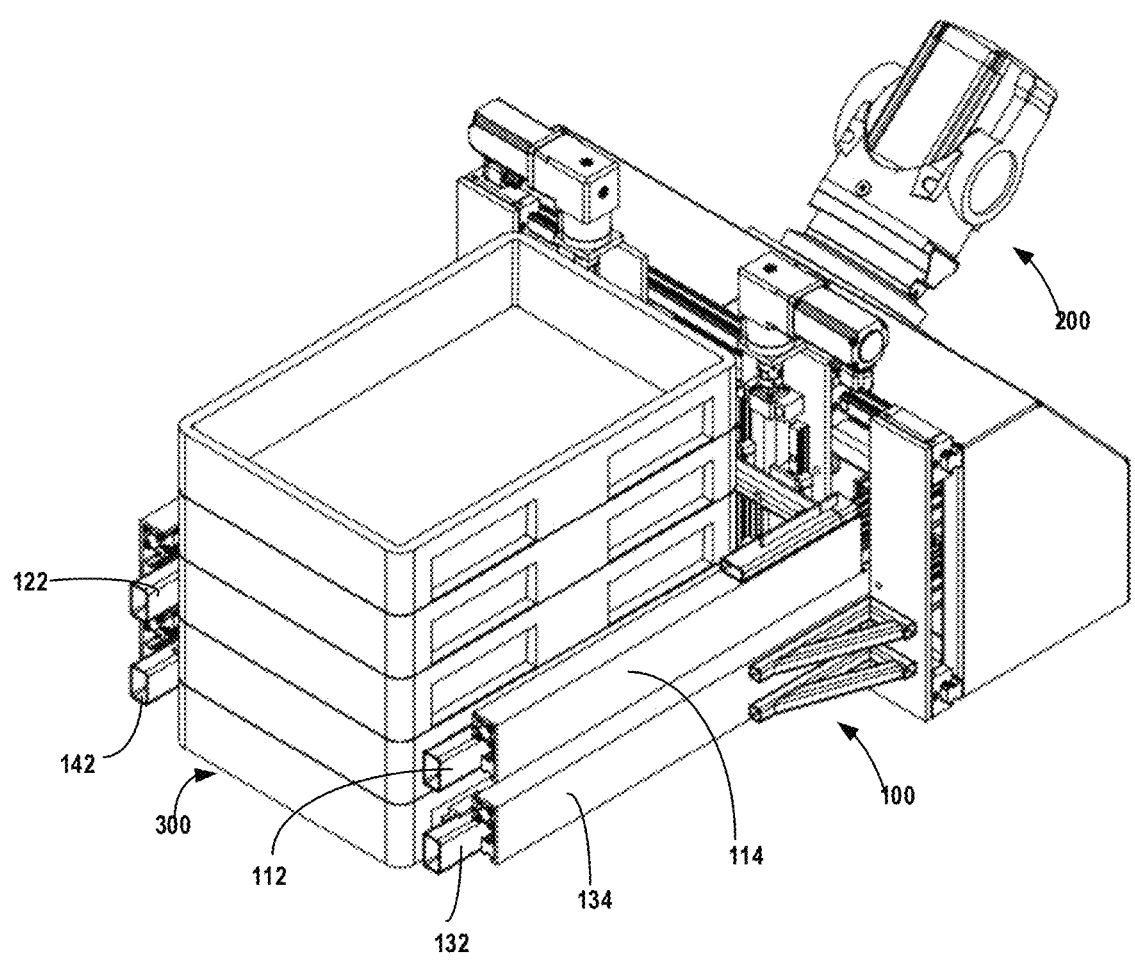
FIG. 8 is a schematic view of a fixture for handling stacking objects according to one example embodiment of the present disclosure, showing a state that two objects are gripped by the upper and lower arms respectively.
Figure 9:
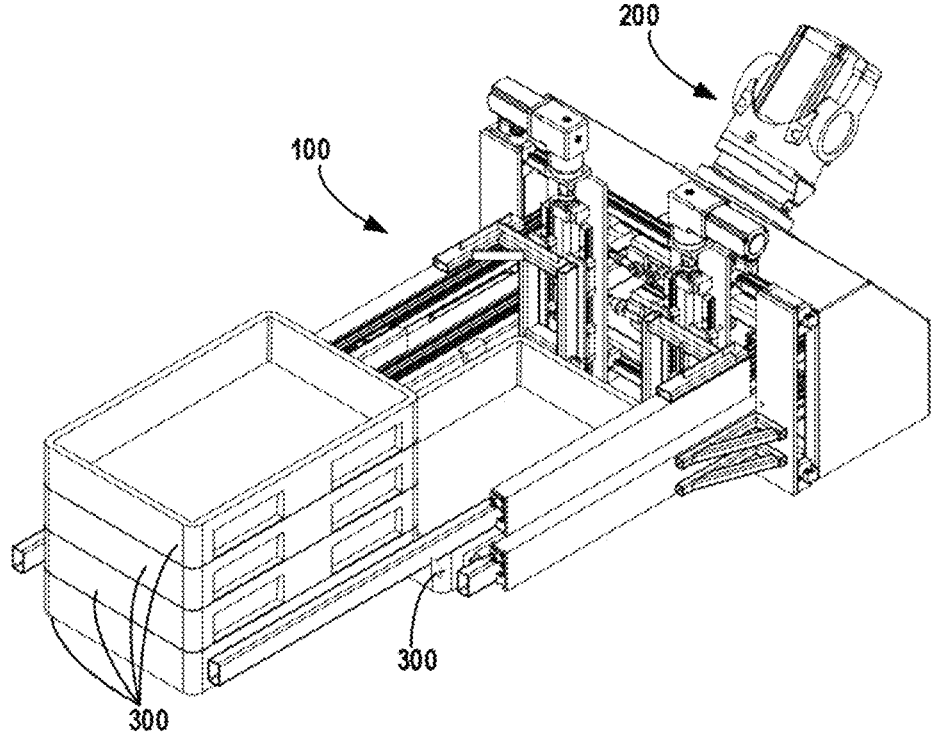
FIG. 9 is a schematic view of a fixture for handling stacking objects according to one example embodiment of the present disclosure, showing a state that one object is separate from the rest of the stacking objects.
Figure 10:
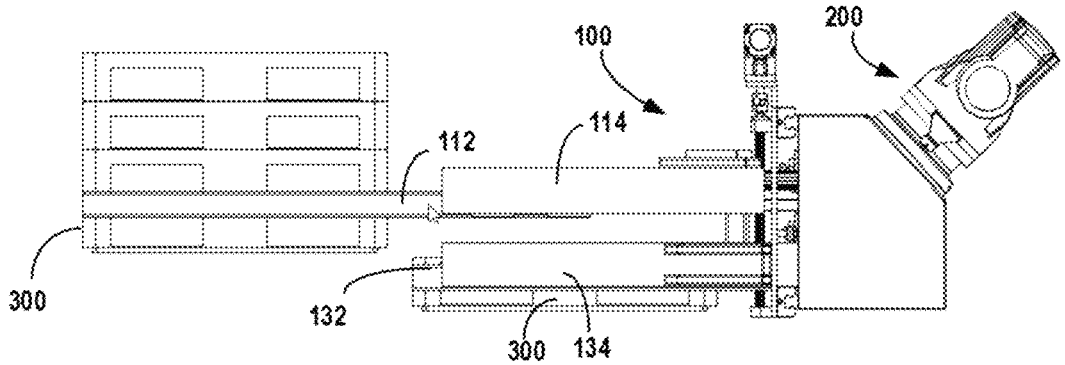
FIG. 10 is a side schematic view of the fixture for handling stacking objects in FIG. 9.

FIGS. 8-10 shows different operation states of the fixture 100 for handling stacking objects according to one example embodiment of the present disclosure. As mentioned above, the stacking objects 300 may be placed on a platform, e.g., a shelf. The fixture 100 is configured to handling the stacking objects 300. According to the present disclosure, any object in the stacking objects 300 can be handled properly with high efficiency by cooperation of the pair of upper arms and the pair of lower arms with the fixture 100 of the present disclosure.

Supposing that an object 302 in the stacking objects 300 located at the bottom is to be sorted out, its exemplary handling processes are illustrated as below. As shown in FIG. 7, a pair of upper arms 112, 122 and a pair of lower arms 132, 142 are located at a retracted position. The pair of upper arms 112, 122 and the pair of lower arms 132, 142 are instructed to move to the shown gripping position. At this state, the object 304 in the stack (i.e., the fourth object from the top in the shown figure) is gripped by the pair of upper arms 112 and 122. The object 302 in the stack (i.e., the fifth object from the top in the shown figure) is gripped by the pair of lower arms 132, 142.

From this position, when the pair of upper arms 112, 122 are moved upward or lifted, the object 304 gripped by the pair of upper arms 112, 122 along with the upper three objects can be moved upward. The object 304 is separate from the object 302 and thus can be movable with respect the object 302. From this state, the object 302 can be easily sorted out by extending the pair of lower arms 132, 142, as shown in FIGS. 8 and 9.

FIGS. 8 and 9 show the states that the object 304 is separate from the object 302. When the object 304 is separate from the object 302, the pair of lower arms 132, 142 is moved to a release position (not shown) at which the pair of lower arms 132, 142 are far away from each other. In this way, the object 304 along with its upper objects can be released and left on the platform. At this moment, the pair of lower arms 132, 142 keeps holding the object 302 and the robotic arm 200 can move the object 302 to any other places, for example to a trolley or a truck, within the working area of the robot.

In the shown examples, the pair of upper arms 112, 122 and the pair of lower arms 132, 142 are initially located at a retracted position. This is applicable to the situation that the stacking objects are placed on the platform near to the robotic arm 200. It is to be understood that the above handling processes are merely illustrative. In an some embodiments (not shown), the pair of upper arms 112, 122 and the pair of lower arms 132, 142 may be located at an extended position and the chosen object may be separated from the others by retracting the corresponding arms. This may be applicable to the situation that the stacking objects are placed on the platform near to the robotic arm 200. The fixture of present application can thus handle a plural of rows, for example two or more rows on the same level on the platform.

In the shown example, only one object 302 is illustrated to be sorted out from the stacking objects 300. It is to be understood that this is merely illustrative and the fixture 100 may configured to handle any number objects in the stacking objects. For example, supposing that the objects 302 and 304 in the stacking objects 300 are to be sorted out, the pair of upper arms 112, 122 may grip the object 306 firstly and the pair of lower arms 132, 142 may grip the object 302. Then, the pair of upper arms 112, 122 may lift the object 306 along with its upper objects to separate from the objects 302 and 304. Then, the objects 302 and 304 can be sorted out by extending or retracting the arms. The remaining objects may be left on the platform.

In the shown examples, the object in the stacking objects can be handled by cooperation of the pair of upper arms and the pair of lower arms. It is to be understood that the above shown processes are merely illustrative, and in many applications, the handling of the objects in the stacking objects can be handled merely by the pair of upper arms or the pair of lower arms. These operations also fall the spirits of the invention.

According to the fixture of the present disclosure, the fixture is of high handling flexibility and the objects can be handled in a fast speed and high efficiency.

Through the teachings provided herein in the above description and relevant drawings, many modifications and other embodiments of the disclosure given herein will be appreciated by those skilled in the art to which the disclosure pertains. Therefore, it is understood that the embodiments of the disclosure are not limited to the specific embodiments of the disclosure, and the modifications and other embodiments are intended to fall within the scope of the disclosure. In addition, while exemplary embodiments have been described in the above description and relevant drawings in the context of some illustrative combinations of components and/or functions, it should be realized that different combinations of components and/or functions can be provided in alternative embodiments without departing from the scope of the disclosure. In this regard, for example, it is anticipated that other combinations of components and/or functions that are different from the above definitely described will also fall within the scope of the disclosure. While specific terms are used herein, they are only used in a general and descriptive sense rather than limiting.

What is claimed is:

1. A fixture for handling stacking objects, comprising:
a frame;
a first carriage arranged on the frame and comprising a first upper arm;
a second carriage arranged on the frame in parallel with the first carriage at a position different from the first carriage in a first direction and comprising a second upper arm;
a first actuator attached to the frame and configured to synchronously move the first carriage and the second carriage in the first direction between a first position at which the first upper arm and the second upper arm are close to each other to clamp a first object from two opposite sides of the first object and a second position at which the first upper arm and the second upper arm are far away from each other to release the first object;

a third carriage arranged on the frame in parallel with the first carriage at a position different from the first carriage in the second direction and comprising a first lower arm;
a fourth carriage arranged on the frame in parallel with the third carriage at a position different from the third carriage in the first direction and comprising a second lower arm; and
a second actuator attached to the frame and configured to synchronously move the third carriage and the fourth carriage in the second direction between a third position at which the first lower arm and the second lower arm are close to each other to clamp a second object from two opposite sides of the second object and a fourth position at which the first lower arm and the second lower arm are far away from each other to release the second object.

2. The fixture of claim 1, wherein each of the first carriage and the second carriage comprises a lifting mechanism configured to lift the respective upper arm in a second direction perpendicular to the first direction.

3. The fixture of claim 2, wherein the lifting mechanism comprises:
a first linear guide rail extending in the second direction;
a driving means comprising a motor and a screw rod coupled to the motor; and
a driven block configured to be linearly driven by the screw rod along the first linear guide rail, the upper arm being carried by the driven block.

4. The fixture of claim 2, wherein each of the first carriage and the second carriage comprises a first guide arm and a first pneumatic actuator arranged on the first guide arm, the first pneumatic actuator being configured to move the respective upper arm in a third direction perpendicular to the first and second directions between a retracted position and an extended position.

5. The fixture of claim 4, wherein the first guide arm comprises a second linear guide rail extending in the third direction, the respective upper arm comprising a rod extending in the third direction and being configured to move along the second linear guide rail.

6. The fixture of claim 4, wherein each of the first carriage and the second carriage comprises a first support plate extending in the second direction and configured to support the lifting mechanism; and
the frame comprises a pair of third linear guide rails extending in the first direction and spaced from each other in the second direction, the first support plate being configured to move along the pair of the third linear guide rails.

7. The fixture of claim 1, wherein the first actuator comprises a second pneumatic actuator comprising two output members, the two output members being coupled with the first and second carriages, respectively, by universal joints to synchronously drive the first and second carriages by the second pneumatic actuator.

8. The fixture of claim 1, wherein each of the third carriage and the fourth carriage comprises a second guide arm and a third pneumatic actuator arranged on the second guide arm, the third pneumatic actuator being configured to drive the respective lower arm in the third direction between a retracted position and an extended position; and
the second guide arm comprises a fourth linear guide rail extending in the third direction, the respective lower arm comprising a rod extending in the third direction and being configured to move along the fourth linear guide rail.

9. The fixture of claim 1, wherein each of the third carriage and the fourth carriage comprises a second support plate extending in the second direction, the third and fourth carriages being configured to move in the first direction by a sliding engagement between the second support plate and the frame.

10. The fixture of claim 1, wherein the second actuator comprises a fourth pneumatic actuator comprising two output members, the two output members being coupled with the third and fourth carriages, respectively, by universal joints to synchronously move the third and fourth carriages by the fourth pneumatic actuator.

11. The fixture of claim 1, wherein the frame comprises a pair of third linear guide rails extending in the first direction and spaced from each other in the second direction, the first, second, third, and fourth carriages being configured move along the pair of the third linear guide rails.

12. A robot comprising:
a robotic arm; and
a fixture for handling stacking objects according to claim 1, the fixture being attached to the robotic arm.

13. The fixture of claim 8, wherein each of the third carriage and the fourth carriage comprises a second support plate extending in the second direction, the third and fourth carriages being configured to move in the first direction by a sliding engagement between the second support plate and the frame.

14. The fixture of claim 8, wherein the second actuator comprises a fourth pneumatic actuator comprising two output members, the two output members being coupled with the third and fourth carriages, respectively, by universal joints to synchronously move the third and fourth carriages by the fourth pneumatic actuator.

15. The fixture of claim 8, wherein the frame comprises a pair of third linear guide rails extending in the first direction and spaced from each other in the second direction, the first, second, third, and fourth carriages being configured move along the pair of the third linear guide rails.

16. The fixture of claim 9, wherein the frame comprises a pair of third linear guide rails extending in the first direction and spaced from each other in the second direction, the first, second, third, and fourth carriages being configured move along the pair of the third linear guide rails.

17. The fixture of claim 10, wherein the frame comprises a pair of third linear guide rails extending in the first direction and spaced from each other in the second direction, the first, second, third, and fourth carriages being configured move along the pair of the third linear guide rails.

18. A fixture for handling stacking objects, comprising:
a frame;
a first carriage arranged on the frame and comprising a first upper arm;
a second carriage arranged on the frame in parallel with the first carriage at a position different from the first carriage in a first direction and comprising a second upper arm; and a first actuator attached to the frame and configured to synchronously move the first carriage and the second carriage in the first direction between a first position at which the first upper arm and the second upper arm are close to each other to clamp a first object from two opposite sides of the first object and a second position at which the first upper arm and the second upper arm are far away from each other to release the first object,
wherein each of the first carriage and the second carriage comprises a lifting mechanism configured to lift the respective upper arm in a second direction perpendicular to the first direction,
wherein the lifting mechanism comprises:
a first linear guide rail extending in the second direction;
a driving means comprising a motor and a screw rod coupled to the motor; and
a driven block configured to be linearly driven by the screw rod along the first linear guide rail, the upper arm being carried by the driven block.

19. A fixture for handling stacking objects, comprising:
a frame;
a first carriage arranged on the frame and comprising a first upper arm;
a second carriage arranged on the frame in parallel with the first carriage at a position different from the first carriage in a first direction and comprising a second upper arm; and
a first actuator attached to the frame and configured to synchronously move the first carriage and the second carriage in the first direction between a first position at which the first upper arm and the second upper arm are close to each other to clamp a first object from two opposite sides of the first object and a second position at which the first upper arm and the second upper arm are far away from each other to release the first object,
wherein each of the first carriage and the second carriage comprises a lifting mechanism configured to lift the respective upper arm in a second direction perpendicular to the first direction,
wherein each of the first carriage and the second carriage comprises a first guide arm and a first pneumatic actuator arranged on the first guide arm, the first pneumatic actuator being configured to move the respective upper arm in a third direction perpendicular to the first and second directions between a retracted position and an extended position,
wherein the first guide arm comprises a second linear guide rail extending in the third direction, the respective upper arm comprising a rod extending in the third direction and being configured to move along the second linear guide rail.

* * * * *